(12) United States Patent
Isabelle et al.

(10) Patent No.: US 11,988,889 B2
(45) Date of Patent: May 21, 2024

(54) LASER PROJECTOR SYSTEM

(71) Applicant: FARO Technologies, Inc., Lake Mary, FL (US)

(72) Inventors: Maxime Thierry Isabelle, Montreal (CA); Joshua Bigham, Pinehurst, NC (US); Matthew T. Armstrong, Glenmoore, PA (US); Salvatore DiAngelus, Glen Mills, PA (US); Joel H. Stave, New Boston, NH (US)

(73) Assignee: FARO Technologies, Inc., Lake Mary, FL (US)

( * ) Notice: Subject to any disclaimer, the term of this patent is extended or adjusted under 35 U.S.C. 154(b) by 880 days.

(21) Appl. No.: 17/068,217

(22) Filed: Oct. 12, 2020

(65) Prior Publication Data

US 2021/0149144 A1 May 20, 2021

Related U.S. Application Data

(60) Provisional application No. 62/935,719, filed on Nov. 15, 2019.

(51) Int. Cl.
*G02B 26/08* (2006.01)
*G01B 7/30* (2006.01)
(Continued)

(52) U.S. Cl.
CPC .............. *G02B 7/005* (2013.01); *G01B 7/30* (2013.01); *G01S 7/4814* (2013.01);
(Continued)

(58) Field of Classification Search
CPC ........ G02B 7/005; G02B 26/105; G01B 7/30; G01B 11/24; G01B 11/303; G01S 7/4814; G01S 7/4817; G01S 17/89; G01S 7/4802; G01S 17/86; G06T 7/75; G06T 2207/10028; G06T 2207/20212; H04N 9/3194; H04N 9/3185

See application file for complete search history.

(56) References Cited

U.S. PATENT DOCUMENTS 8,582,087 B2    11/2013   Kaufman et al.
9,074,883 B2    7/2015   Schumann et al.
(Continued)

FOREIGN PATENT DOCUMENTS

WO    2019087726 A1    5/2019

OTHER PUBLICATIONS

Extended European Searchh Report for Application No. 20207466.2 dated Jul. 16, 2021; 22 pgs.
(Continued)

*Primary Examiner* — Euncha P Cherry
(74) *Attorney, Agent, or Firm* — McCarter & English, LLP; Dave S. Christensen

(57) ABSTRACT

A light projector and method of aligning the light projector is provided. A light projector steers an outgoing beam of light onto an object, passing light returned from the object through a focusing lens onto an optical detector. The light projector may generate a light pattern or template by rapidly moving the outgoing beam of light along a path on a surface. To place the light pattern/template in a desired location, the light projector may be aligned with an electronic model.

16 Claims, 14 Drawing Sheets

(51) Int. Cl.
  *G01S 7/481* (2006.01)
  *G01S 17/89* (2020.01)
  *G02B 7/00* (2021.01)
  *G02B 26/10* (2006.01)
  *G06T 7/73* (2017.01)

(52) U.S. Cl.
  CPC ............ *G01S 7/4817* (2013.01); *G01S 17/89* (2013.01); *G02B 26/105* (2013.01); *G06T 7/75* (2017.01); *G06T 2207/10028* (2013.01); *G06T 2207/20212* (2013.01)

(56) References Cited

U.S. PATENT DOCUMENTS

| | | |
|---|---|---|
| 9,200,899 B2 | 12/2015 | Rueb |
| 9,245,062 B2 | 1/2016 | Rueb |
| 10,052,734 B2 | 8/2018 | Rueb |
| 10,239,178 B2 | 3/2019 | Rueb |
| 2004/0189944 A1 | 9/2004 | Kaufman et al. |
| 2005/0121422 A1* | 6/2005 | Morden .................. B25H 7/00 700/95 |
| 2007/0076090 A1* | 4/2007 | Alexander ........... H04N 13/239 348/51 |
| 2014/0210996 A1 | 7/2014 | Rueb |
| 2015/0085108 A1 | 3/2015 | Kaufman et al. |
| 2015/0377606 A1 | 12/2015 | Thielemans |
| 2016/0343125 A1 | 11/2016 | Keitler et al. |
| 2018/0104788 A1 | 4/2018 | Rueb |

OTHER PUBLICATIONS

Partial European Search Report dated Apr. 19, 2021.
European Office Action for Application No. 20207466.2, dated Apr. 11, 2023, 9 pages.

* cited by examiner

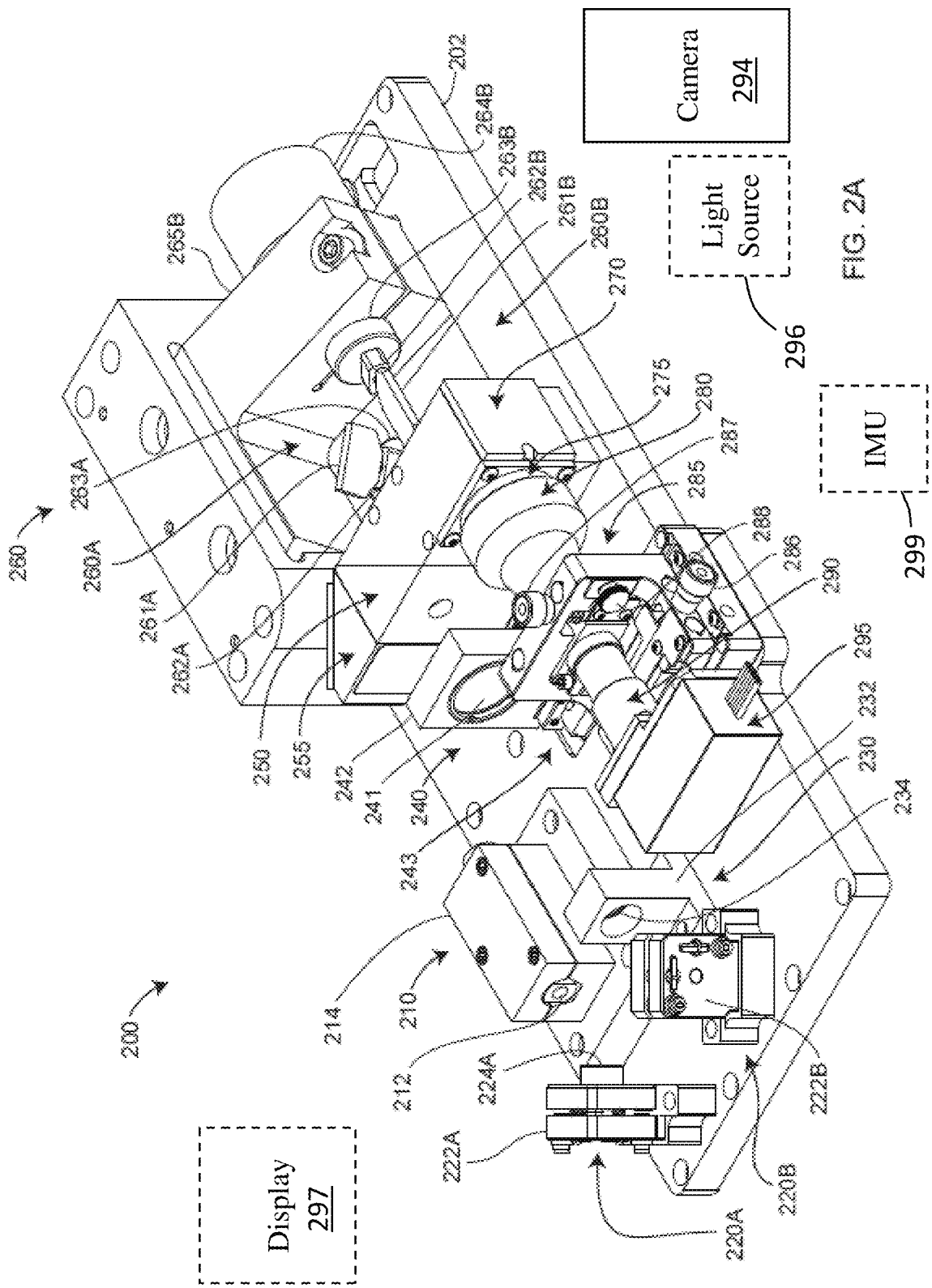

LASER PROJECTOR SYSTEM

CROSS-REFERENCE TO RELATED APPLICATIONS

The present application claims the benefit of, and is a nonprovisional application of, U.S. Provisional Application Ser. No. 62/935,719 filed on Nov. 15, 2019, the contents of which are incorporated by reference herein in their entirety.

BACKGROUND

The subject matter disclosed herein relates to a light projection system, often referred to as a "laser projection system" or "laser projector," and in particular to a light projection system that projects a glowing light pattern onto an object without using retroreflective or cooperative targets.

Light projection devices are used in a variety of applications to project images onto objects. In some applications, an illuminated three-dimensional (3D) pattern, also referred to as a "template," is projected onto an object. The template may be formed, for example, by projecting a rapidly moving, vector-scan, light beam onto the object. In some systems, the projected light beam is a laser beam. The light beam strikes the surface of the object following a predetermined trajectory in a repetitive manner. When repetitively moved at a sufficiently high beam speed and refresh rate, the trace of the projected beam on the object appears to the human eye as a continuous glowing line. The projected pattern of light appears as the glowing template that can be used to assist in the positioning of parts, components and work pieces. In some cases, the projected template is based partly on computer aided design (CAD) data of the object.

A challenge faced by light projection devices is in aligning the light projection system to the environment in which it is located so that the template is positioned in the desired location and orientation. Accordingly, while existing systems and methods of patterned light projection are suitable for their intended purposes, the need for improvement remains, particularly in providing a light projection system having the features described herein.

BRIEF DESCRIPTION

According to one aspect of the disclosure, a method of aligning a light projector and an electronic model in an environment is provided. The method comprising: placing the light projector in the environment; acquire a photographic image of the environment; associate a plurality features in the environment with a plurality of points in the electronic model; and aligning the light projector to the electronic model based at least in part on the plurality of features and the plurality of points.

In addition to one or more of the features described herein, or as an alternative, further embodiments of the method may include the step of associating the plurality of features with the plurality of points includes automatically detecting with a processor the features in the photographic image. In addition to one or more of the features described herein, or as an alternative, further embodiments of the method may include the photographic image is acquired by a camera that is integral with the light projector. In addition to one or more of the features described herein, or as an alternative, further embodiments of the method may include selecting between acquiring an intensity image and the photographic image.

In addition to one or more of the features described herein, or as an alternative, further embodiments of the method may include the plurality of features is four or more features. In addition to one or more of the features described herein, or as an alternative, further embodiments of the method may include the plurality of features is equal to or greater than six features. In addition to one or more of the features described herein, or as an alternative, further embodiments of the method may include checking on a periodic or aperiodic basis for drift.

In addition to one or more of the features described herein, or as an alternative, further embodiments of the method may include the checking for drift includes placing at least one retroreflective target in the environment and acquiring a second photographic image of the at least one retroreflective target. In addition to one or more of the features described herein, or as an alternative, further embodiments of the method may include the checking for drift further comprises identifying the at least one retroreflective target in the second image and comparing a position of the at least one retroreflective target in the second image with an expected position of the at least one retroreflective target. In addition to one or more of the features described herein, or as an alternative, further embodiments of the method may include the checking for drift further comprises realigning the light projector and electronic model when a deviation between the position of the at least one retroreflective target in the second image and the expected position exceeds a threshold.

In addition to one or more of the features described herein, or as an alternative, further embodiments of the method may include measuring an angle rotation of the light projector with at least one sensor; and realigning the light projector to the electronic model based at least in part on the measured angle of rotation. In addition to one or more of the features described herein, or as an alternative, further embodiments of the method may include scanning the environment with a laser scanner to obtain a plurality of three-dimensional coordinates in the environment, a portion of the plurality of three-dimensional coordinates being on a surface; extracting the surface from the plurality of three-dimensional coordinates; generating at least two topographical curves based on a flatness of the surface; and projecting a light pattern on the surface with the light projector based at least in part on the at least two topographical curves.

In addition to one or more of the features described herein, or as an alternative, further embodiments of the method may include placing a plurality of targets in the environment prior to scanning with the laser scanner, the plurality of targets being within a field of view of the laser scanner and located in the photographic image. In addition to one or more of the features described herein, or as an alternative, further embodiments of the method may include the alignment of the light projector to the electronic model is based at least in part on the plurality of targets. In addition to one or more of the features described herein, or as an alternative, further embodiments of the method may include the electronic model is based at least in part on the plurality of three-dimensional coordinates.

In accordance with another aspect of the disclosure a system is provided. The system comprising: a light projector having a light source, a beam-steering system operable to direct a beam of outgoing light onto a surface, the light projector further having an optical detector configured to receive at least a portion of a light beam reflected off of the surface; a camera operably coupled to the light projector in a known geometric arrangement, the camera having a photosensitive array with a field of view; and one or more processors that are operable to execute computer instructions to perform a method comprising: receive an electronic model of an environment in which the light projector is located; cause the camera to acquire a photographic image; identify a plurality of features in the photographic image; associate the plurality of features with a plurality of points in the electronic model; and align the light projector and the electronic model based on the association of the plurality of features with the plurality of points.

In addition to one or more of the features described herein, or as an alternative, further embodiments of the system may include the one or more processors is further configured to perform a method comprising: acquiring on a periodic or aperiodic basis a second photographic image of the environment; identifying a retroreflective target in the second photographic image; comparing a position of the retroreflective target with an expected position; and realigning the light projector to the electronic model when a deviation between the position and the expected position exceeds a threshold. In addition to one or more of the features described herein, or as an alternative, further embodiments of the system may include the one or more processors is further configured to perform a method comprising: measuring an angle of rotation of the light projector; and realigning the light projector to the electronic model based at least in part on the angle of rotation, wherein the angle of rotation is measured by at least one sensor integral with the light projector.

In addition to one or more of the features described herein, or as an alternative, further embodiments of the system may include the at least one sensor is part of an inertial measurement unit that it integral with the light projector. In addition to one or more of the features described herein, or as an alternative, further embodiments of the system may include a laser scanner having a second light source and a second optical detector, the laser scanner being configured to measure a plurality of three-dimensional coordinates in the environment; wherein the one or more processors is further configured to perform a method comprising: causing laser scanner to acquire the plurality of three-dimensional coordinates, a portion of the three-dimensional coordinates being on a surface; extracting the portion of the plurality of three-dimensional coordinates; generating at least two topographical curves based on a flatness of the surface; and causing the light projector to project a light pattern on the surface with the light projector based at least in part on the at least two topographical curves.

In addition to one or more of the features described herein, or as an alternative, further embodiments of the system may include the electronic model is based at least in part on the plurality of three-dimensional coordinates. In addition to one or more of the features described herein, or as an alternative, further embodiments of the system may include the camera is integral with the light projector.

According to another aspect of the disclosure a method of operating a light projector is provided. The method comprising: acquiring a plurality of images of the environment; generating a point cloud based at least in part on the plurality of images; defining at least one quadratic surface based at least in part on the point cloud; acquiring a light projector image of the environment with the light projector; aligning the light projector image with the plurality of images; aligning the light projector with the point cloud based on the aligning of the light projector with the plurality of images; and projecting a light pattern onto the at least one quadratic surface based at least in part on the aligning of the light projector with the point cloud.

In addition to one or more of the features described herein, or as an alternative, further embodiments of the method may include stitching the plurality of images together; and wherein the generating of the point cloud is further based at least in part on the stitching of the plurality of images. In addition to one or more of the features described herein, or as an alternative, further embodiments of the method may include the plurality of images covers a range of 360 degrees about an area where the light projector will be placed. In addition to one or more of the features described herein, or as an alternative, further embodiments of the method may include the plurality of images includes an area where the light pattern will be projected.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

FIG. 2A, FIG. 2B, and FIG. 2C are perspective, top, and side views, respectively, of optical and electro-optical elements of the light projector according to an embodiment;

The detailed description explains embodiments of the disclosure, together with advantages and features, by way of example with reference to the drawings.

DETAILED DESCRIPTION

Embodiments provide improved operating a light projector. Embodiments provide advantages in automatically or semi-automatically aligning a light projector to an environment. Further embodiments provide advantages in automatically or semi-automatically checking a light projector for drift or changes in alignment. Still further embodiments provide for a method of realigning a light projector in response to the light projector being moved or rotated. Still further embodiments provide for an alignment of a light projector and the projection of topographical lines on a surface.

Figure 1B:
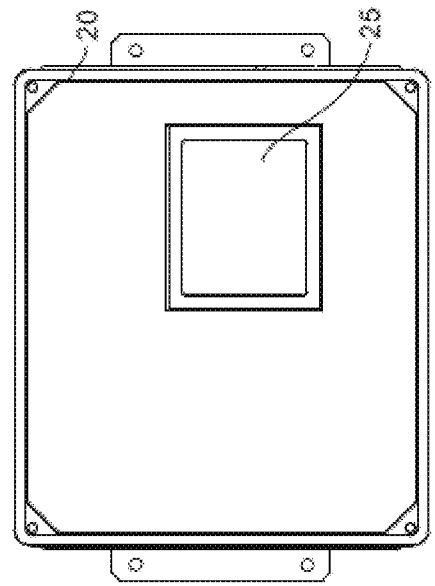
FIGS. 1A, 1B, 1C are perspective, front, and bottom views, respectively, of a light projector according to an embodiment.
Figure 1C:
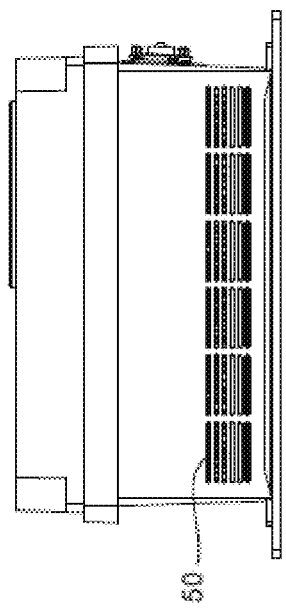
Figure 1A:
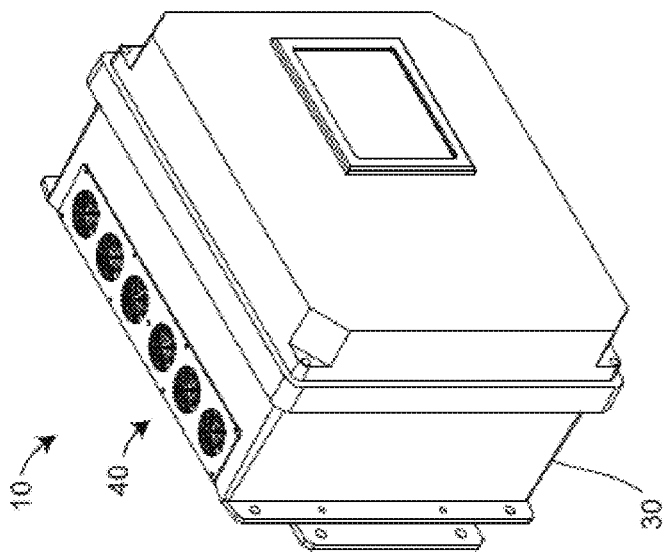

FIGS. 1A, 1B, 1C are perspective, front, and bottom views of a light projector 10 according to an embodiment. In an embodiment, the light projector 10 includes a front cover 20, a window 25, a base housing 30, a fan assembly 40, and venting slots 50. In an embodiment, a beam of light is sent out of and returned back through the window 25. In another embodiment, the light projector 10' may include a second window 55. As described in more detail herein, a the light projector 10' includes one or more two-dimensional or three-dimensional (e.g. RGB-D) cameras. In an embodiment, the cameras acquire images through the second window 55.

FIGS. 2A, 2B, 2C, 2D are perspective, top, side, and cross-sectional views, respectively, of an electro-optical plate assembly 200 within the light projector 10. In an embodiment, the light projector 10 includes a mounting plate 202, a light source assembly 210, fold mirror assemblies, 220A, 220B, expanding lens assembly 230, collimating/focusing lens assembly 240, beamsplitter assembly 250, two-axis beam-steering assembly 260, reflector mirror assembly 270, focusing lens assembly 275, In an embodiment, the light source assembly 210 includes a light source 212 and a mounting block 214. In an embodiment, the light source 212 is a diode-pumped solid state laser (DPSS) that emits a round beam of green laser light having a wavelength of about 532 nm. In other embodiments, the light source 212 is a different type of laser such as a diode laser or is a non-laser source. In an embodiment, the fold mirror assemblies 220A, 220B include fold mirrors 224A, 224B, respectively, and adjustable mirror mounts 222A, 222B, respectively. In an embodiment, light from the light source reflects off the fold mirrors 224A, 224B and then travels through a beam expander 230, which includes a beam expander lens 234 and a beam expander mount 232. The expanded beam of light from the beam expander 230 travels through a collimating/focusing lens assembly 240, which acts to focus the beam leaving the light projector 10 onto an object of interest. Because the light leaving the light projector 10 is relatively far from the light projector 10, the beam of light is nearly collimated and converges relatively slowly to a focused spot. In an embodiment, the collimating/focusing lens assembly 240 includes a lens 241, a lens mount 242, and a motorized focusing stage 243. The motorized focusing stage 243 adjusts the position of the lens 241 and lens mount 242 to focus the beam of light onto the object of interest. In an embodiment, the motorized focusing stage 243 includes a servomotor assembly 244 that drives a rotary actuator 245 attached to shaft 246 affixed to an attachment 247. As the rotary actuator 245 rotates, it causes the lens mount 242 to be translated on a ball slide 248.

In an embodiment, the beamsplitter assembly 250 includes entrance aperture 251A, exit aperture 251B, and beamsplitter 252. In an embodiment, the beamsplitter 252 is a 50/50 beamsplitter, which is to say that the beamsplitter 252 transmits half and reflects half the incident optical power. Half of the light arriving at the beamsplitter assembly 250 from the collimating/focusing lens assembly 240 is reflected onto a beam absorber assembly 255, which absorbs almost all the light, thereby preventing unwanted reflected light from passing back into the electro-optical plate assembly 200. In an embodiment, the beam absorber assembly 255 includes a neutral density filter 256, a felt absorber 257, and a felt absorber 258.

Figure 4:
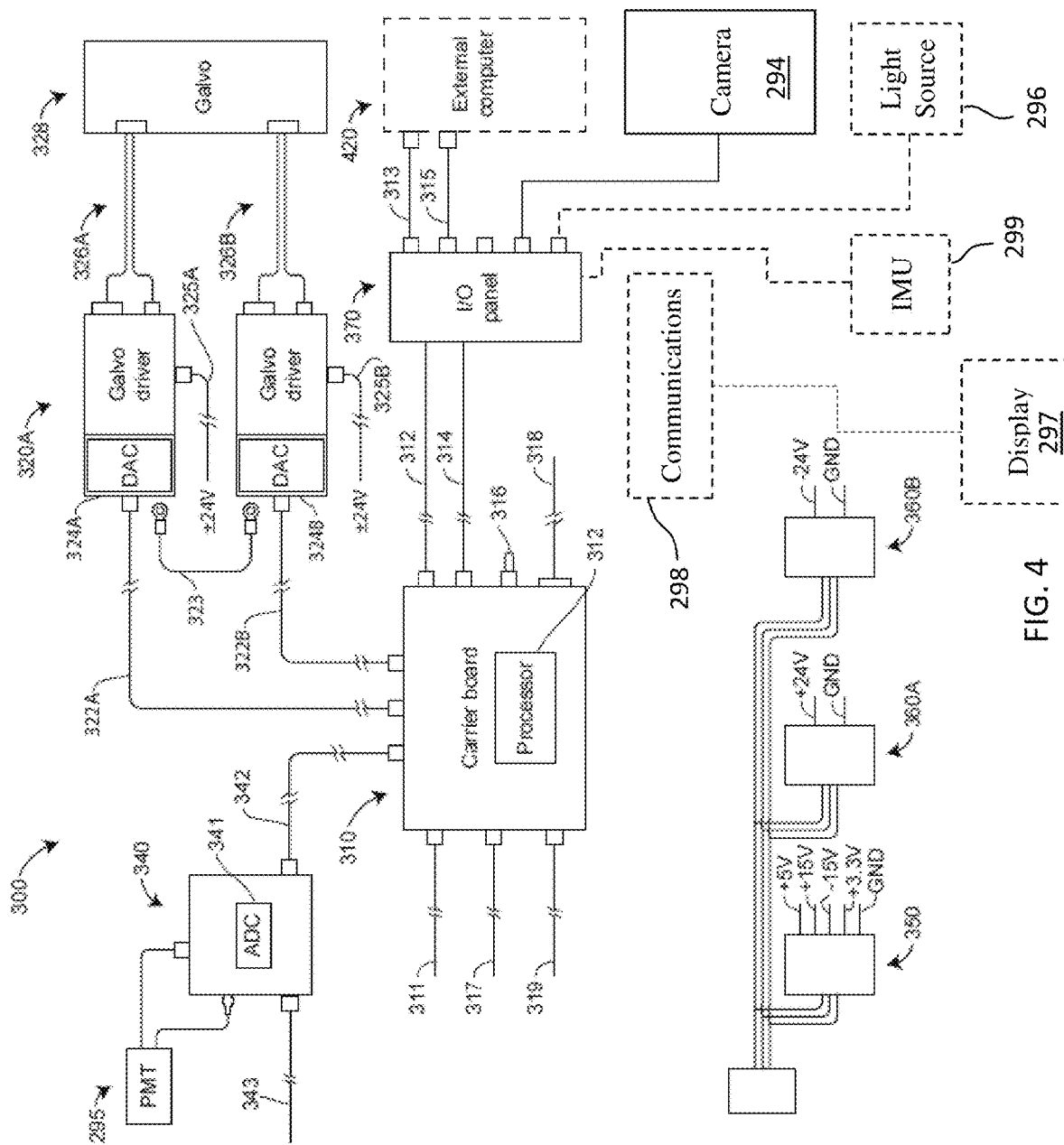
FIG. 4 is an electrical block diagram of the light projector according to an embodiment.

The two-axis beam-steering assembly 260 includes beam steering assemblies 260A, 260B. Each beam steering assembly 260A, 260B includes respectively a light weight mirror 261A, 261B, a mirror mount 262A, 262B, a motor 263A, 263B, a position detector 264A, 264B, and a mounting block 265A, 265B. The first mirror 261A steers the beam of light to the second mirror 261B, which steers the beam out of the window 25 to the object of interest. The beam-steering assembly 260 steers the beam in each of two orthogonal axes, sometimes referred to as x-y axes. In an embodiment, the beam-steering assembly 260 is provided steering directions to move the beam of light in a predetermined pattern by a processor 312 (FIG. 4). Light reflected or scattered off the object of interest retraces the outgoing path, striking first the mirror 261B and then the mirror 261A before passing through the exit aperture 251B, and reflecting off the beamsplitter 252. Beam steering assemblies such as 260A, 260B are also each referred to as galvanometers or galvos, which is an electromechanical device that works as an actuator that produces a rotary deflection, in this case of the mirrors 261A, 261B.

The mirror assembly 270 includes mount 271 and return mirror 272. The focusing mirror assembly 275 includes focusing lens 276 and lens mount 277. In an embodiment, light arriving at the return mirror 272 from the beamsplitter 252 passes through the focusing lens 276. In an embodiment, the focusing lens 276 is a doublet. In an embodiment, an opaque cone 280 smoothly slides over lens mount 277 and attaches rigidly to adjustment stage 285. The purpose of the opaque cone 280 is to block background light from within the light projector 10 from contaminating the light emitted by the light source 210 and reflected off the object of interest and passing through the lens 276. Aperture assembly includes aperture 291 and aperture mount 292. In an embodiment, the aperture assembly 290 is rigidly affixed to the optical detector assembly 295 by an interface element 292. In an embodiment, the aperture assembly 290 is further rigidly coupled to the adjustment stage 285. The adjustment stage 285 is adjusted in the x direction by an x adjuster 286, in they direction by a y adjuster 287, and in the z direction by a z adjuster 288. The purpose of the adjustment stage 285 is to adjust the position of the aperture 291 and the optical detector assembly 295 in x, y, and z relative to the beam of light to enable the focused beam of light 281 to pass through the aperture for the object of interest located within the rated range of distances of the object being scanned with the light from the light projector 10. The purpose of the aperture is to block unwanted background light, especially light scattered from within the enclosure of the laser projector 10, for example, off the mirrors 216A, 216B, the beamsplitter 252, the components of the beam block 255, the return mirror 272, and the focusing lens 276. In addition, the aperture 291 helps to block unwanted background light from the environment outside the enclosure of the light projector 10. Examples of such unwanted background light blocked by the aperture include artificial light and sunlight, both direct and reflected.

In an embodiment, the aperture 291 is a circular aperture. In an embodiment, the circular aperture has a diameter of 150 micrometers and a centering accuracy of +/−20 micrometers. A circular aperture is often referred to as a pinhole, and the element 291 may alternatively be referred to as an aperture or a pinhole. In other embodiments, the aperture is not circular but has another shape.

The optical detector assembly 295 receives light on an optical detector within the assembly 295 and produces an electrical signal in response. In an embodiment, the optical detector is a photomultiplier tube (PMT). In an embodiment, the PMT is includes a high-voltage supply circuit and a low-noise amplifier. In an embodiment, the amplifier is connected close to the PMT anode output pin to reduce the effect of external noise on the produced electrical signal. In an embodiment, the PMT is a Hamamatsu H11903 photosensor manufactured by Hamamatsu Photonics K.K., with headquarters in Shimokanzo, Japan. An advantage of a PMT for the present application includes high sensitivity to small optical powers and ability to measure both very weak optical signals and very strong optical signals. In an embodiment, the gain of the PMT can be adjusted by a factor of 100,000 or more according to the selected gain level, which is determined by the voltage applied to the PMT. This wide range of achievable gains enables the light projector to measure object regions ranging from dark black to bright white or shiny (i.e. highly reflective).

As explained herein above, the motorized focusing stage 243 adjusts the position of the lens 241 and lens mount 242 to focus the beam of light from the light projector 10 onto the object of interest. In an embodiment, the motorized focusing stage 243 adjusts the position of the collimating/focusing lens assembly 240 to each of several positions, thereby producing scanning lines of different widths. In an embodiment, the desired focusing of the collimating/focusing lens assembly 240 is found by stepping the lens 241 to each of several positions. At each of those positions, the galvo mirrors 261A, 261B are used to steer the projected light along a line. Without being bound to a particular theory, it is believed the reason for this change in relative optical power level is speckle, which is an effect in which laser light scattered off different portions of an object interfere constructively or destructively to produce the fluctuations in returned optical power. When a laser beam is focused, the relative change in the returned optical power is increased as the beam is swept along the object. In an embodiment, the motorized focusing stage 243 is adjusted until the maximum change in relative optical power is achieved in scanning a line. This ensures that the lens 241 has been adjusted to the position of optimal focus.

Figure 5A:
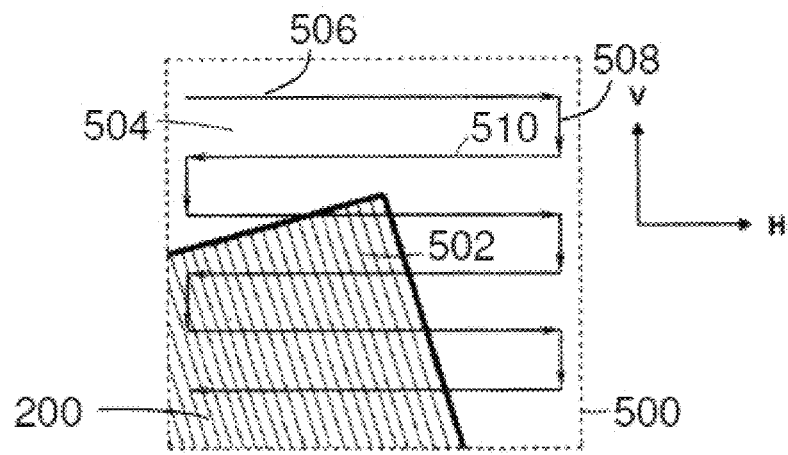
FIG. 5A is a diagram illustrating a path of the laser beam emitted from the system of FIG. 1 forming a scan pattern in accordance with an embodiment.

In an embodiment, a pre-scan is performed to determine the desired level of gain for a given scan region (FIG. 5A). For example, if a region is scanned with some elements in the region having a relatively high reflectance, for example because the elements are white, the gain of the PMT is set to a relatively low value since the optical power returned to the PMT is relatively high. On the other hand, if scanning is performed on a region containing only elements having relatively low reflectance, for example because the elements are black or dark, the gain of the PMT is set to a relatively high value. In an embodiment, a pre-scan is performed on a region to be measured as a way to obtain relatively high measurement sensitivity without saturating the PMT. In other words, the use of a pre-scan enables relatively dark objects to be measured even at relatively large distances from the light projector 10. When a region includes both white or light objects as well as black or dark objects, in an embodiment, the region may be broken into sub-regions, with separate scans performed for at least some of the sub-regions.

In an embodiment shown in FIG. 5A, the light projector 10' performs an initial scan of an area 500 around an object or surface 502 in the environment. The light beam is steered via galvanometers 260A, 260B and mirrors 261A, 261B at a constant velocity and varying azimuth angle H along a pattern 504. The pattern 504 begins along trace line 506. At the end of line 506, the mirror 261A stops and the mirror 261B steers the beam to vary the elevation of the signal light beam along line 508. The mirror 261B then stops and the mirror 261A steers the signal light beam along retrace line 510. This scan process continues in this bi-directional manner to cover the area 500. It should be appreciated that during each trace and retrace, the galvanometer 403 is driven by a stream of digital command signals from processor 312 via a galvo driver 301A, 320B. In an embodiment, the command signals are transmitted at substantially equal time increments as defined by the master clock. At each time increment, processor 312 processes the output of an ADC to determine the pulse amplitude for the object feedback signal that corresponds to the feedback light intensity. In an embodiment, the processor 312 constructs a two-dimensional image array comprised of a series of rows. Each row representing a digitized signal intensity along the trace or retrace line.

In an embodiment, after the completion of the preliminary scan, the processor 312 analyzes a captured digital intensity image (based at least in part of the image array) and determines the high or maximum value of the image array. That value corresponds to a large or maximum amplitude of the amplified feedback signal pulses. Based on the result, the processor may determine adequate levels of controls for that could be used for the next detailed object scan to keep the pulse signals amplitudes within an acceptable signal range for the photodetector assembly 295. It should be appreciated that multiple successive preliminary scans could be performed to establish proper levels of controls for the photodetector assembly 295.

Figure 5B:
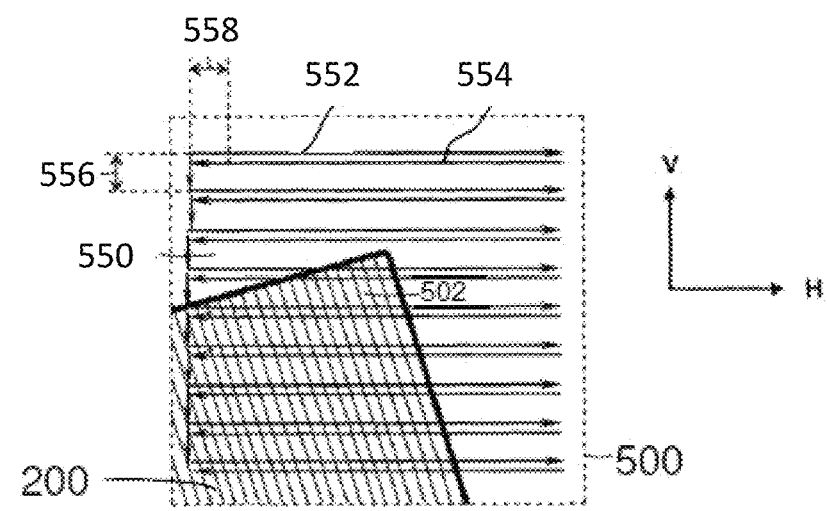
FIG. 5B is a diagram illustrating another path of the laser beam emitted from the light projector of FIG. 1 forming a scan pattern in accordance with an embodiment.

The detailed object/surface scan that is being performed after one or more preliminary scans is illustrated in FIG. 5B. It shows a scan trajectory that follows a bi-directional scan pattern 550. In contrast to the preliminary scan, in an embodiment, the final scan includes a trace 552 and a retrace 554 that are superimposed or collinear. It should be appreciated that lines 552, 554 are illustrated slightly separated in FIG. 5B for clarity purposes only. The processor 312 then proceeds to perform the scan line by line, as described herein with respect to the preliminary scan, with the trace and retrace lines being separated by a vertical segment 556. In an embodiment, the trace and retrace line segment 556 (V pixel size) and the sampling interval 558 (H pixel size) are each typically between 30 to 50 micro radians. In an embodiment, the resolution is user definable.

In an embodiment, an array of pixel data is being constructed by the processor 312 as the result of the detailed object scan. Each element of the array is associated with the H and V pixel locations and contains the values of the feedback light intensity and the time-of-flight represented as the time delay between the reference signal pulse and the feedback signal pulse. The light intensity values are utilized to construct a pixelized two-dimensional intensity image for object feature detection. This feature detection may be the same as that described in U.S. Pat. No. 8,582,087, the contents of which are incorporated herein by reference. The time-of-flight represented as the time delay is used to calculate the distance between the system 10' and the pixel point by multiplying the value of time delay by the speed of light in air. The time delay is determined as being the difference between the timing locations of the reference signal waveform and the feedback signal waveform with respect to the train of sampling pulses generated by sampling clock. An exemplary method of extracting the timing location of the pulse waveform independently from the pulse's amplitude is described in Merrill Scolnik, "Introduction to Radar Systems", McGraw-Hill, International Editions, 2002, the contents of which are incorporated herein by reference.

In an embodiment, the light from the light source 212 that leaves the light projector 10' travels to the object of interest and scatters off the object in a solid angle, afterwards retracing its path as it returns to the light projector 10'. After reflecting off the mirrors 261B, 261A, the solid angle of returning scattered light is limited in size by the exit aperture 251B. The light then reflects off beam splitter 252 before passing through the lens 276 to form the focused light beam 281. The direction of focused light beam 281 is determined by the path from a first point at which light from the light projector 10 strikes the object to a second point through the center of the entrance pupil of the lens 276. In an embodiment, the aperture 291 is further aligned to the path that extends from the first point to the second point and into the optical detector assembly 295. Furthermore, in an embodiment, the position of the aperture 291 as adjusted in the z direction to cause the beam waist of the returning beam of light to pass through the aperture 291 when the object is in the range of 5 to 7 meters from the light projector 10. In an embodiment, the aperture 291 is large enough to pass nearly all of the return light through the exit aperture 251B onto the active area of the optical detector at the range of 5 to 7 meters. In an embodiment, the light begins to clip slightly at larger distances such as 10 to 15 meters from the light projector 10'. At distances closer to the light projector 10 than 5 meters, the light may clip more significantly, but this is not usually a problem because the optical power scattered off an object point closer than 5 meters has larger scattered intensity than light scattered off an object point farther from the light projector 10'.

In an embodiment, the aperture 291 is rigidly affixed to the aperture assembly 290, which in turn is rigidly affixed to the optical detector assembly 295. In an embodiment, the optical detector assembly 295 and aperture assembly 290 are further aligned to ensure that returning light passing through the center of the entrance pupil of the lens 276 not only passes through the center of aperture 291 but also the center of the active area of the optical detector in the optical detector assembly 295. As a result, the range of operation of the light projector 10 is made as large as possible. This is to say that the rigid attachment of the aperture 291 to the photodetector assembly 295 in combination with alignment of the aperture 291, the photodetector assembly 295, the lens 276, and the exit aperture 251B helps to ensure that the best sensitivity is obtained for objects both near to and far from the light projector 10'. With this alignment, the pre-scan is also expected to give consistent results in determining the PMT gain settings required for each combination of object distance and object reflectance.

Figure 3:
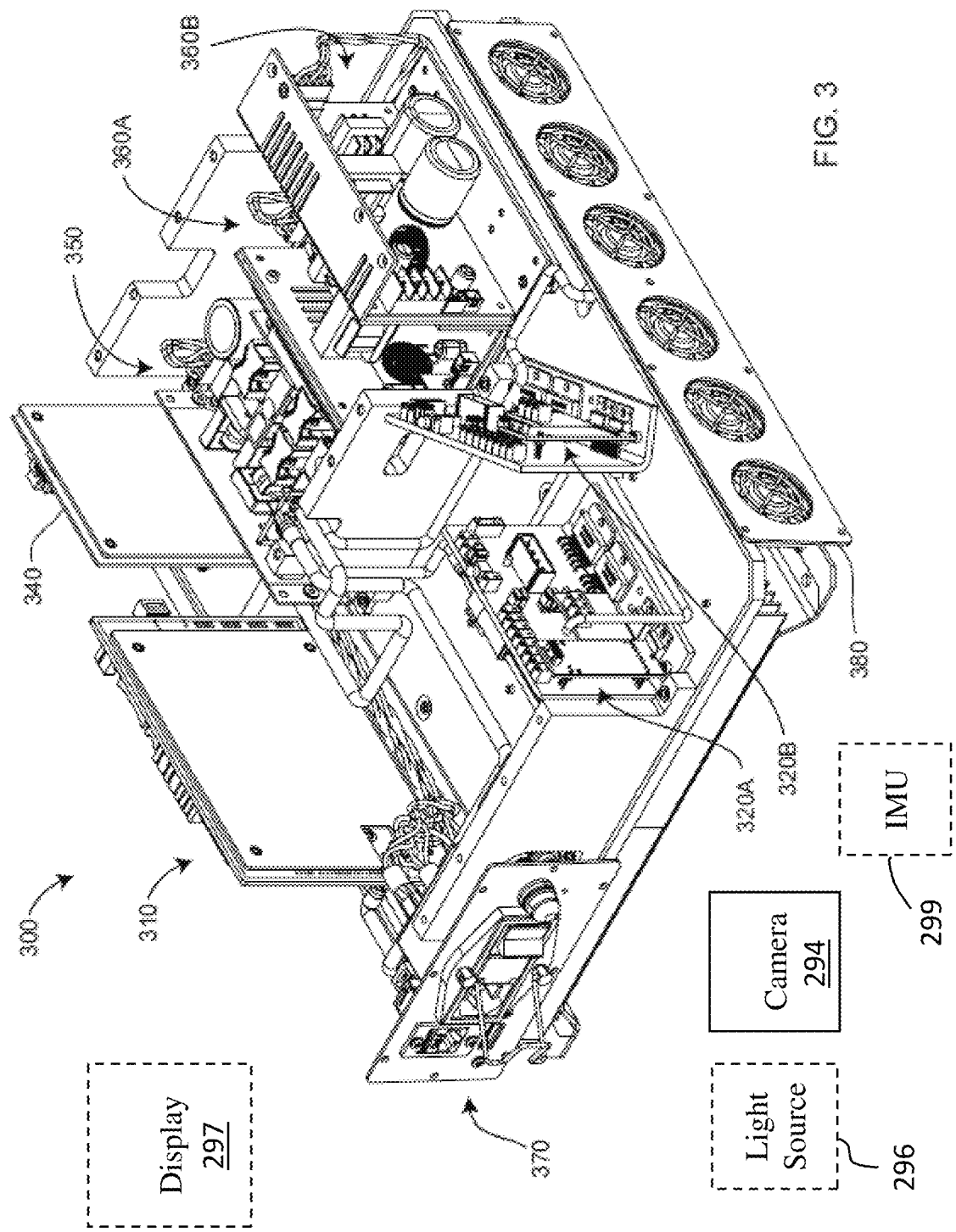
FIG. 3 is a perspective view of electrical components within the light projector according to an embodiment.

FIG. 3 is a perspective view of the electrical assembly 300 within the light projector 10', and FIG. 4 is an electrical block diagram for the light projector 10'. The electrical assembly 300 includes an electronics plate 302 and a number of circuit boards including a carrier board 310, first galvo driver 320A, second galvo driver 320B, analog circuit 340, multi-voltage power supply 350, +24 volt power supply 360A, and −24 volt power supply 360B. The circuit block diagram representation for the electrical assembly 300 is shown in FIG. 4. The carrier board 310 includes a processor 312 that controls many functions within the light projector 10. Control cables 322A, 322B run from the carrier board 310 to digital-to-analog converters (DACs) 324A, 324B on the first and second galvo driver boards 320A, 320B, respectively. Control signals sent from the carrier board 310 to the DACs 324A, 324B control the angles of the mirrors 261A, 261B, thereby controlling the direction to which the beam is steered. Power supplies 360A, 360B supply +24 volts, −24 volts, respectively, to the galvo drivers 320A, 320B, which in turn supply voltages to the galvo motor/position-sensing components 328 through cables 326A, 326B. In an embodiment, a jumper cable 232 is used to connect the first and second galvo driver boards 320A, 320B when synchronized steering is needed in two dimensions (such as X and Y directions).

The analog circuit board 340 includes an analog-to-digital converter (ADC) 341. The ADC 341 receives an analog electrical signals from the optical detector 295, which in an embodiment is a PMT. The ADC 341 converts the analog signals into digital electrical signals, which it sends over an Ethernet cable 342 to the carrier board 310. The carrier board provides the digital data to the processor 312 and, in an embodiment, to an external computer attached to input/output (I/O) panel 370 through a USB cables 313, 314, an Ethernet cable 315, 316, and/or a wireless channel. In an embodiment, the processor 312 or external computer 420 constructs a gray-scale image of the optical powers received by optical detector 295. This image is sometimes referred to as an intensity image, which is different from a photographic image acquired by the camera 294. Such an image may be displayed to a user, may be used to identify features in the scanned object, and may be used for other functions such as setting the position of the focusing lens 241 with the motorized focusing stage 243. In an embodiment, the analog circuit board 340 receives voltages over the cable 343 from the multi-voltage power supply 350. In an embodiment, the carrier board 310 further provides control signals to the motorized focusing stage 243 over the cable 317 and control signals to the light source 212 over the cable 318. A connector 316 is attached to the circuit board to override the laser bypass circuit. In an embodiment, the carrier board 310 is further provided with a cable 319 operable to send a signal to reset the software on the carrier board. The carrier board 310 receives voltages over the cable 311 from the multi-voltage power supply 350. In an embodiment, additional voltages are provided from the multi-voltage power supply 350 to the I/O panel 370 and to the fan assembly 380.

In an embodiment, the light projector further includes a 2D camera 294 and a light source 296. As discussed in more detail herein with reference to FIGS. 6-9, the camera 294 includes a photosensitive array, a shutter, an aperture and one or more lens that may be used to acquire a photographic image of the environment within the field of view of the camera 294 via the window 55. In one or more embodiments, the camera 294 is operably coupled to a display 297 that includes a user interface that is operable to display the acquired image and allow interaction with the operator. In an embodiment, the display 297 may be integral with the housing 30 and acquire images via the second window 55. In another embodiment, the display 297 may be remote from the light projector 10'. The display 297 may be coupled to the camera 294 and/or the processor 312 via wired (e.g. Universal Serial Bus or Ethernet) or via a wireless (e.g.

IEEE 802.11, WiFi, or Bluetooth™) communications mediums. In an embodiment, the light projector 10' may include a communications module 298 (FIG. 4) that is configured to transmit and receive signals from the processor 312, the camera 294, the display 297, and/or one or more remotely located computers. In an embodiment, the display 297 is a mobile computing device, such as a laptop or a tablet computer that is coupled for communication with the light projector 10' via the communications module 298.

In an embodiment, the communications module may include a IEEE 802.11 (i.e. WiFi) compatible transceiver. The transceiver is configured to emit a signal in the IEEE 802.11 spectrum upon startup of the light projector 10. In this embodiment, the display 297 (or the computing device to which it is attached) may detect the signal and establish communications in accordance with the IEEE 802.11 protocol directly with the light projector 10. It should be appreciated that this provides advantages in environments where there may be no IEEE 802.11 infrastructure or network in place.

In embodiments where the environment where the light projector 10 is to be used has an IEEE 802.11 network available, the display 297 (or the computing device to which it is attached) may connect to the light projector 10 via the network. In an embodiment, the communications module 298 includes an IEEE 802.3 (i.e. Ethernet) communications port. The light projector 10 connects to the IEEE 802.3 network and the display 298 connects to the IEEE 802.11 network. The network created by the IEEE 802.3 and IEEE 802.11 networks provides a communication path between the display 297 and the light projector 10. It should be appreciated that this provides advantages in allowing for a remote connection (e.g. the display 298 is remote from the light projector) or in connecting the display 297 to multiple light projectors 10. In an embodiment, both the light projector 10 and the display 297 connect for communication via the IEEE 802.11 network.

Figure 1D:
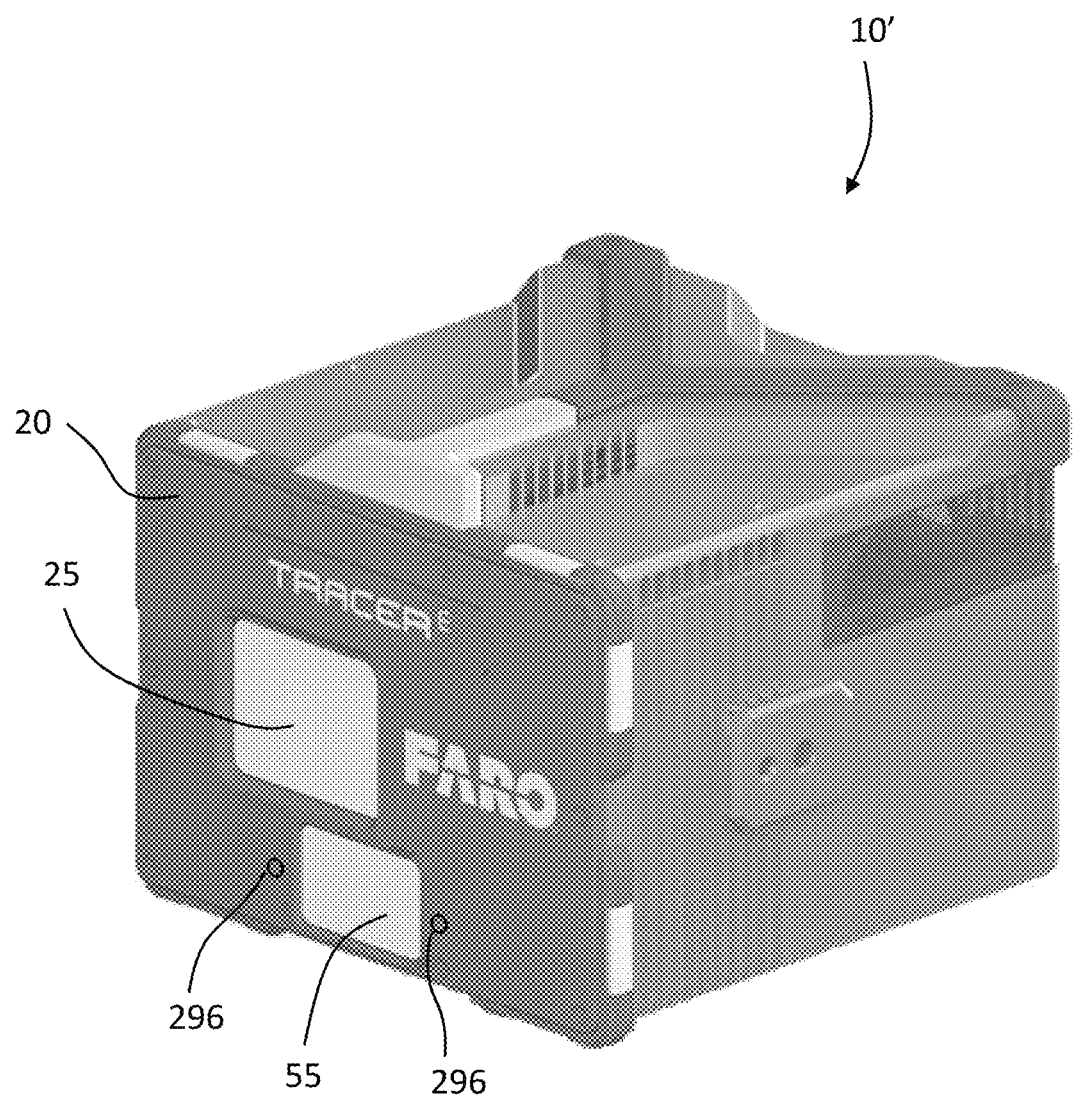
FIG. 1D is a perspective view of the light projector in accordance with another embodiment.
Figure 2B:
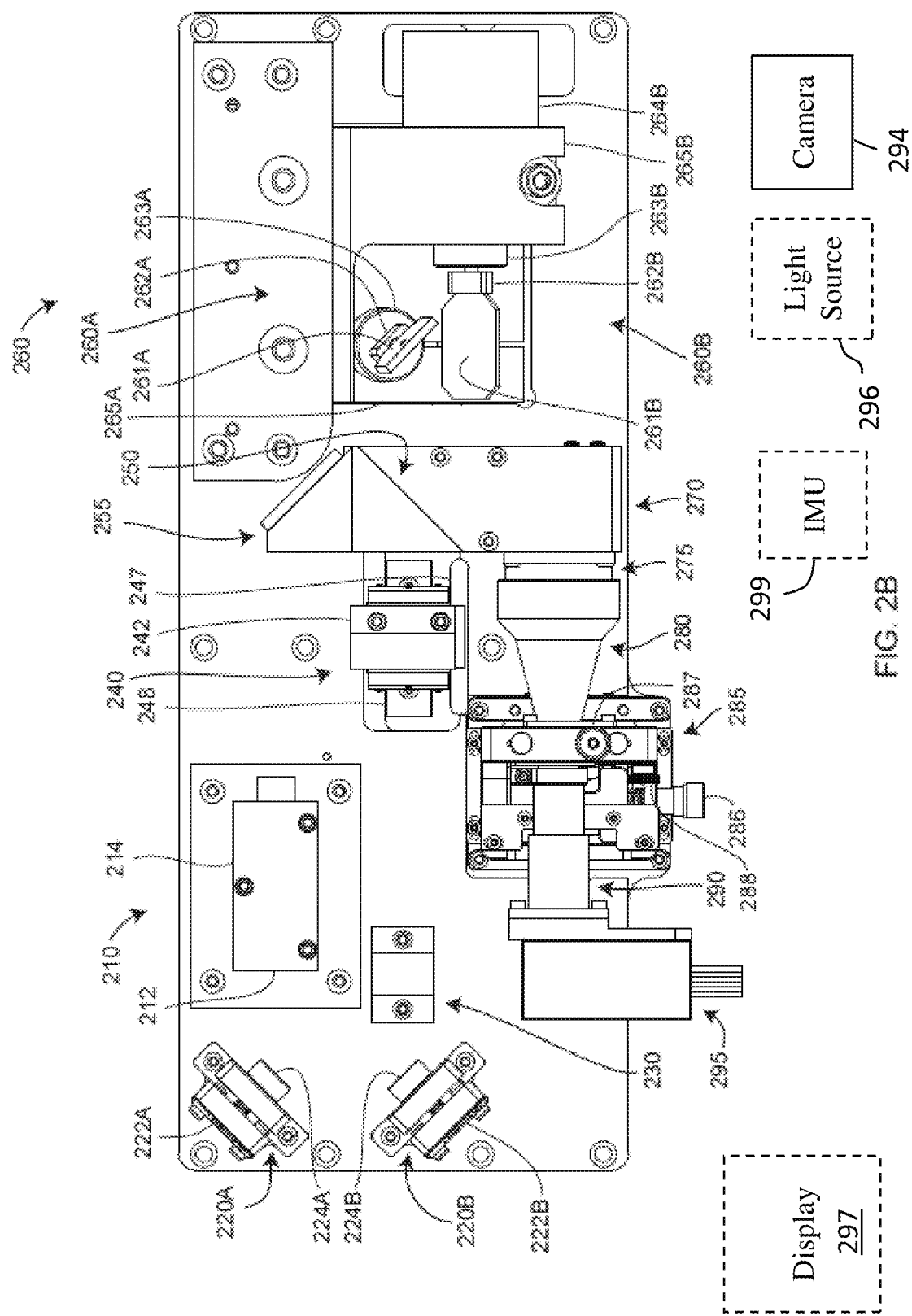
Figure 2C:
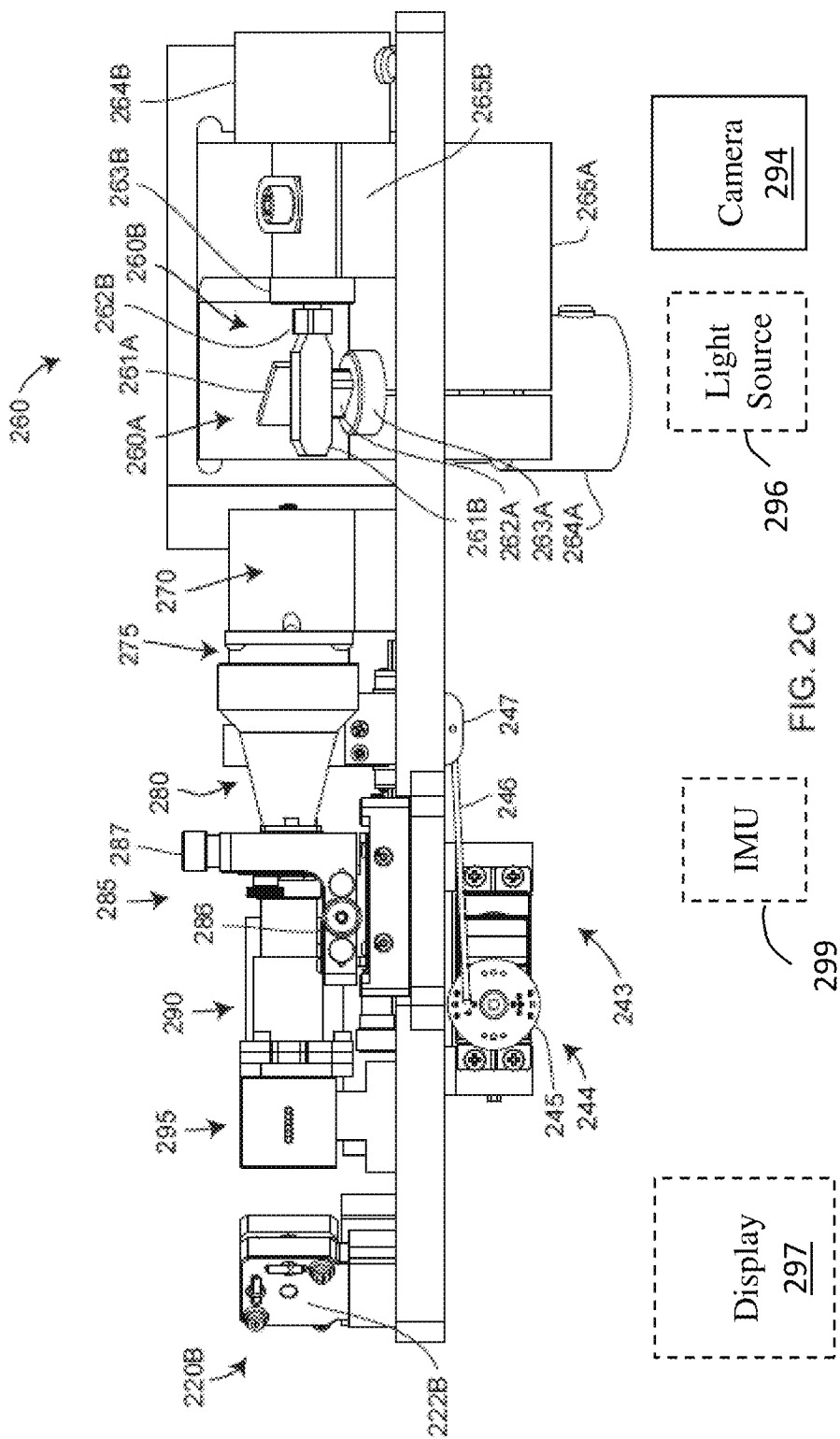
Figure 2D:
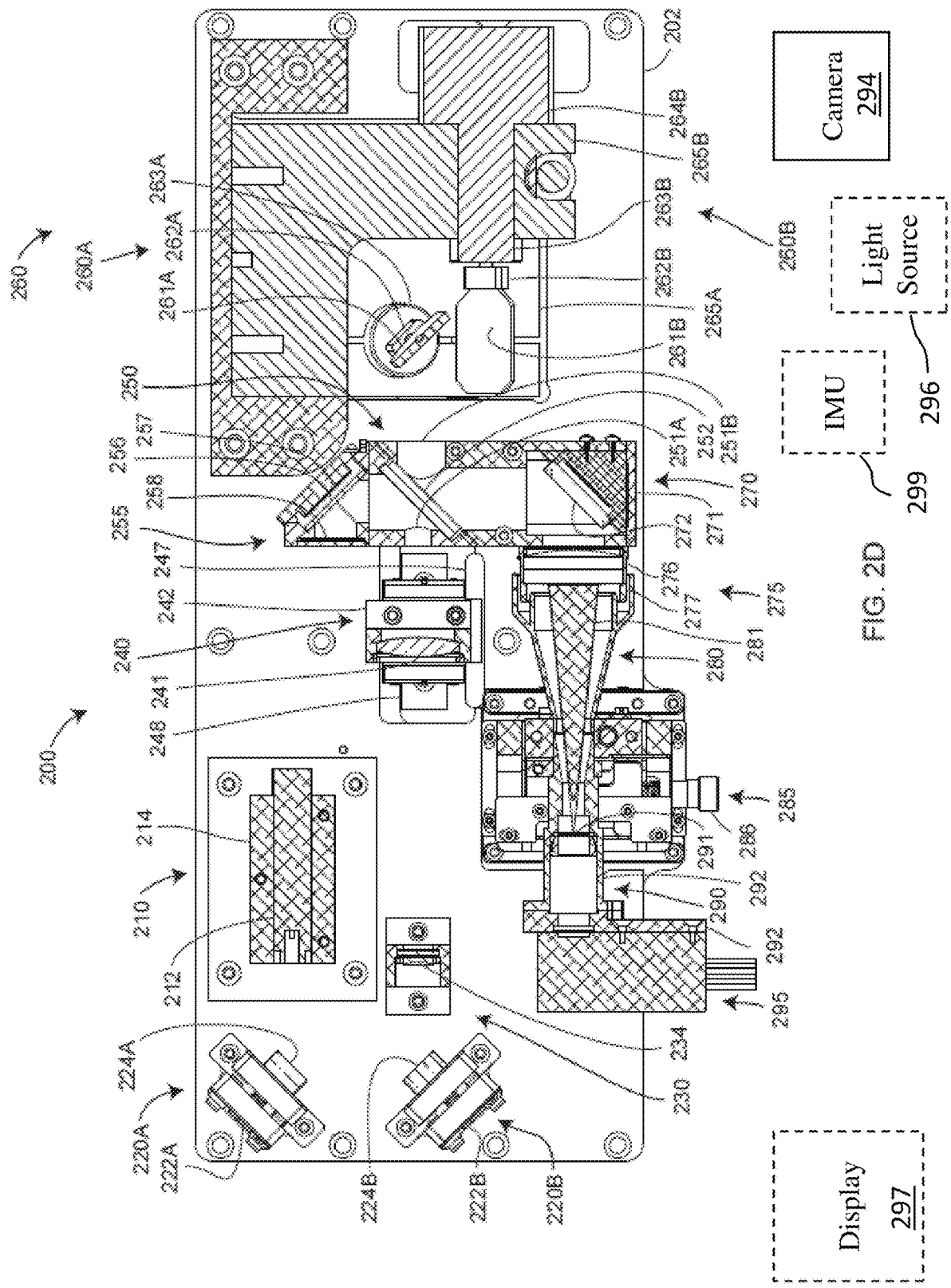
FIG. 2D is a cross-sectional view of an optical and electro-optical elements of the light projector according to an embodiment.

In an embodiment, the light source 296 may include a plurality of light emitting elements (FIG. 1D), such as light emitting diodes (LED's). The LED's 296 may be positioned on the front cover 20 about the window 55. In an embodiment, the LED's 296 are activated to illuminate the environment when the camera 294 acquires an image.

In an embodiment, the light projector 10' may further include an inertial measurement unit 299 (IMU) that includes sensors, such as accelerometers, compasses, or gyroscopes for example, that allow for an estimation of translational and rotational movement of the light projector 10'. As discussed in more detail herein, the IMU 299 provides additional information that in some embodiments may be used to align the light projector 10' with an electronic model.

In an embodiment, the light projector 10' may be the same as that described in commonly owned and concurrently filed United States Provisional Application entitled "Laser Projector", the contents of which are incorporated by reference herein.

It should be appreciated that in order for the image or template to be projected in the desired location, and in the desired pose, the position and orientation/pose of the light projector 10' in the environment needs to be registered to the model of the environment (e.g. CAD model, As-built CAD model, point cloud). In this way, the processor 312 can determine the vectors for emitting light along a path on a surface in the environment to form the image or template.

Figure 6:
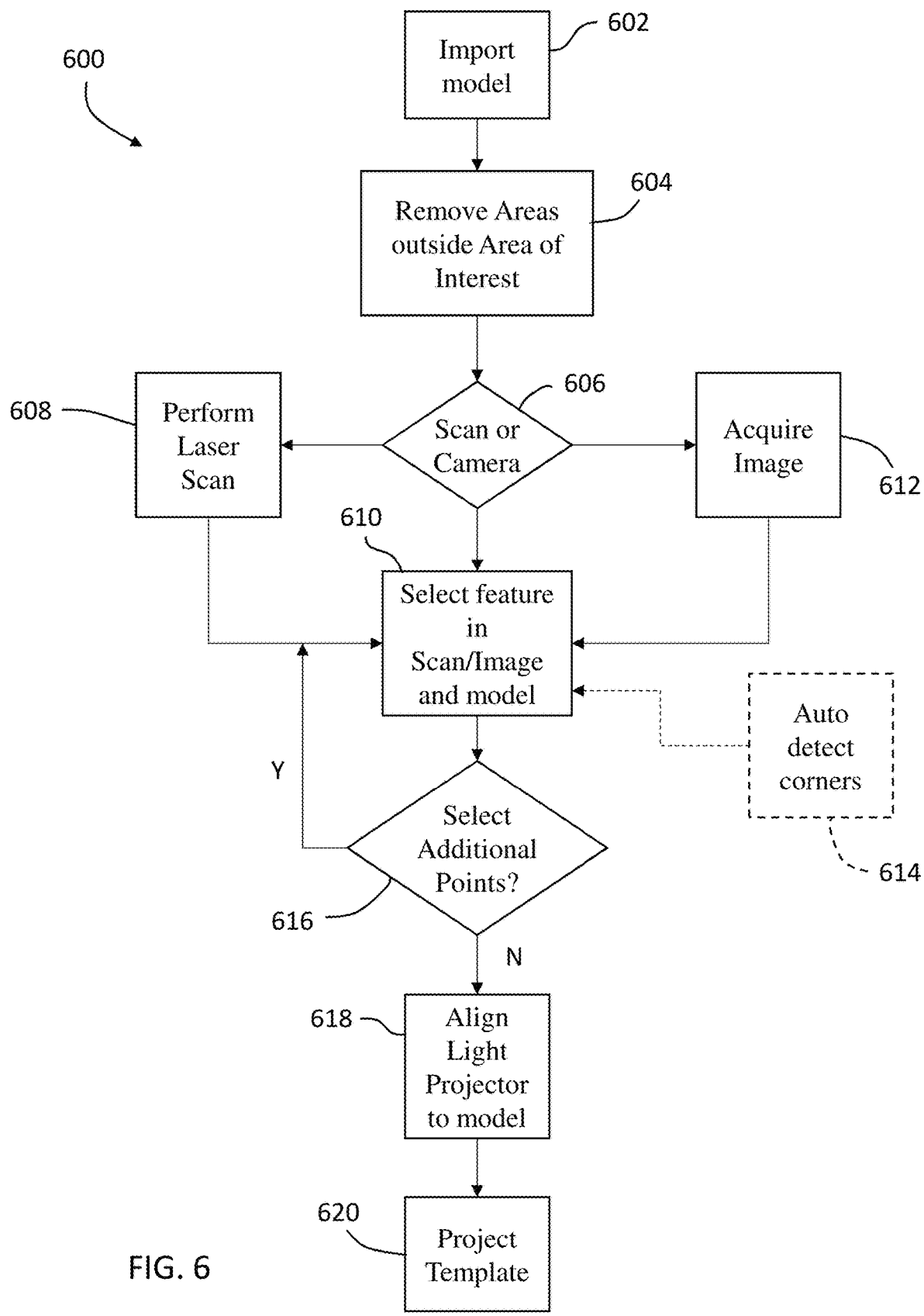
FIG. 6 is a flow diagram illustrating a method of aligning the light projector of FIG. 1 in accordance with an embodiment.

Referring now to FIG. 6, an embodiment of a method 600 is shown for registering or aligning the light projector 10' to the electronic model of the environment. The method 600 begins in block 602 where the electronic model is imported. In the illustrated embodiment, the electronic model is imported into, or is available to the processor 312. In other embodiments, the electronic model may be imported into a computing device remote from the light projector 10'. In still other embodiments, the electronic model is imported into the computing device associated with display 297.

The method 600 then proceeds to block 604 where an optional step is provided for removing portions of the electronic model that are not relevant to the area where the template is to be projected. It should be appreciated that an electronic model, such as a computer-aided-design (CAD) model of a building for example, will have more data than the area where the template is to be projected. In some embodiments, the operator may clip, trim, or delete portions of the electronic model. In some embodiments, by removing portions of the electronic model, the performance of the computing device may be improved.

The method 600 then proceeds to query block 606 where the operator decides whether to register or align the light projector 10' using an intensity image or a photographic image. When the query block 606 returns a scan election, indicating that the operator wants to use the intensity image, the method 600 proceeds to block 608 where the light projector 10' performs a scan over its field of view (e.g. FIG. 5B) as described herein. In an embodiment, the operator may activate the camera 294 to display in a viewfinder window on display 297 an image of the area in front of the camera 294. By using the viewfinder, the operator can move, rotate, or change the orientation of the light projector 10' to generally be oriented towards the area where the template is to be projected. Once the scan is completed, the intensity image is displayed on the display 297 and the method 600 proceeds to block 610.

When the query block 606 returns a camera election, indicating that the operator wants to use a photographic image, the method 600 proceeds to block 612 where an image is acquired using the camera 294. It should be appreciated that the operator may activate the camera 294 and use the viewfinder window to position and orient the light projector 10' towards the desired area as described above. It should be appreciated that the acquisition of the photographic image is faster than performing the scan to generate the intensity image. In some embodiments, the light projector 10' may activate the light source 296 to illuminate the environment when the photographic image is acquired. In some embodiments, the operator may place reflective targets or contrast targets (e.g. black and white checkerboard) in the environment within the field of view of the camera 294. Once the photographic image is acquired, the process proceeds to block 610.

In block 610, the intensity image or the photographic image is displayed on the display 297. In the display 297, the operator selects a feature in the environment, such as a corner of a wall or a reflective target for example. The operator then selects the same feature in the electronic model to define or associate that these locations as representing the same point in space. In an embodiment, the feature is natural feature and may be automatically detected in block 614 using a suitable image processing technique, such as but not limited to Canny, Solbel, Kayyali detectors or a Gaussian or Hessian type detector for example.

The method 600 then proceeds to query block 616 where it is determined whether additional points in the environment/model are desired. In the illustrated embodiment, it is desired to have four or more points identified in the environment/model. In other embodiments, it is desired to have at least six points identified in the environment/model. When the query block 616 returns a positive, the method 600 loops back to block 610 and additional points are identified in the image and the model.

It should be appreciated that in some embodiments there may not be a sufficient number of natural features (e.g. corners) to obtain a desired level of alignment. In one embodiment, when fewer natural features than are desired are within the field of view, the operator may create an artificial point in space using a device such as a plumb bob for example. The operator installs the plumb bob and measures using a tape measure from known locations to the point of the plumb bob. A corresponding point may then be added to the electronic model. In still other embodiments, an artifact having multiple retroreflective targets may be placed in the environment within the field of view of the image.

It should be appreciated that there may be a difference between an electronic design-model that was generated as part of the original design, and an as-built model. The as-built model will be generally more accurate regarding the position/location of features. As a result when a design-model is used, in some instances the alignment will deviate from a desired level of accuracy. In some embodiments, the movement or rotation data from the IMU 299 may be used to narrow the solution space so avoid or reduce the risk of an alignment that is incorrect. In other embodiments, one or more artifacts placed in the environment may provide an indication on whether the alignment is within desired accuracy parameters.

When the query block 616 returns a negative, meaning a sufficient number of features/points having been identified in the image and the model, the process 600 proceeds to block 618 where the light projector 10' and the electronic model are aligned using the features/points identified in block 610. With the light projector 10' and the electronic model aligned, the process 600 proceeds to block 620 where the path for emitting the light is determined and the template is projected onto a surface in the environment. In an embodiment, the features and points are aligned using a best fit methodology.

In some embodiments, during operation the alignment of the light projector 10' to the electronic model will change or move, this is sometimes referred to as "drift." Without being bound to any particular theory, it is believed that drift may be caused by galvanometers heating or from physical interaction between the light projector 10' the operator (e.g. the light projector is accidentally bumped), or vibrations in the environment (e.g. on the surface the light projector is placed).

Figure 7:
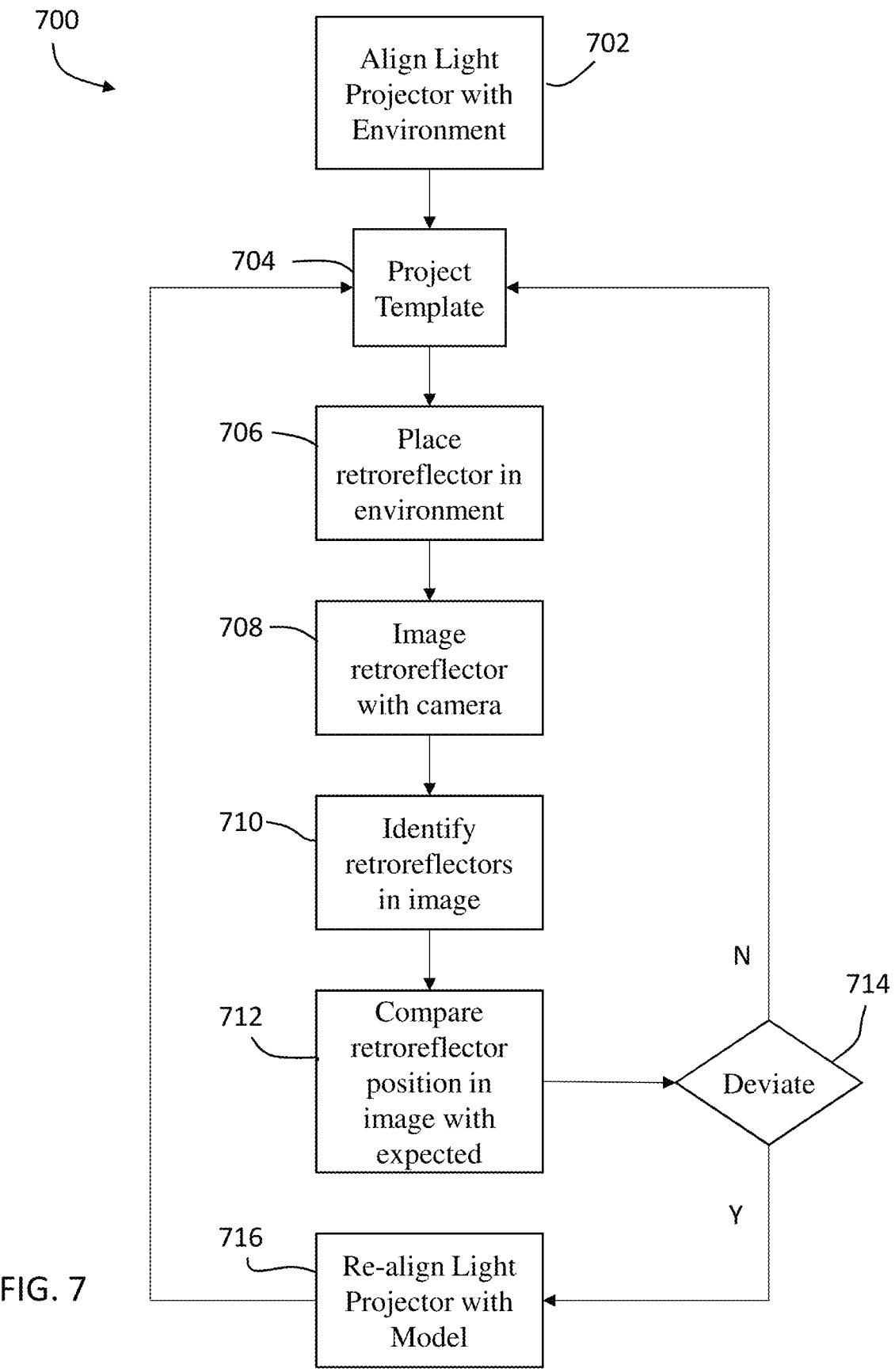
FIG. 7 is a flow diagram illustrating a method of checking for drift and realigning the laser projector of FIG. 1 in accordance with an embodiment.

Referring to FIG. 7, an embodiment of a method 700 is shown for performing a periodic drift check. The method 700 starts in block 702 with the light projector 10' and the electronic model being aligned, such as in the manner described with reference to FIG. 6. The method 700 then proceeds to block 704 where the template or image is projected onto a surface within the environment. Then on a periodic or aperiodic basis, or when requested by the operator, a drift check will be performed. The method 700 proceeds to block 706 where one or more retroreflective targets are placed in the environment within the field of view of the camera 294. The method then proceeds to block 708 where a photographic image of the one or more retroreflective targets are acquired. In some embodiments, the acquisition of the photographic image includes activating the light source 296.

With the photographic image acquired, the method 700 proceeds to block 710 where the retroreflective targets are identified. The method 700 then compares in block 712 the positions of the retroreflective targets in the photographic image with the expected position of the of the retroreflective targets. The method 700 proceeds to block 714 where it is determined if the deviation in the imaged position from the expected position is more than a predetermined threshold. When the query block 714 returns a negative the method 700 loops back to block 704.

When the query block 714 returns a positive, the method 700 proceeds to block 716 where the light projector 10' is once again aligned with the electronic model, such as in the manner described herein above with respect to FIG. 6. With the light projector 10' and electronic model re-aligned, the method 700 loops back to block 704 to continue projecting the image or template.

Figure 8:
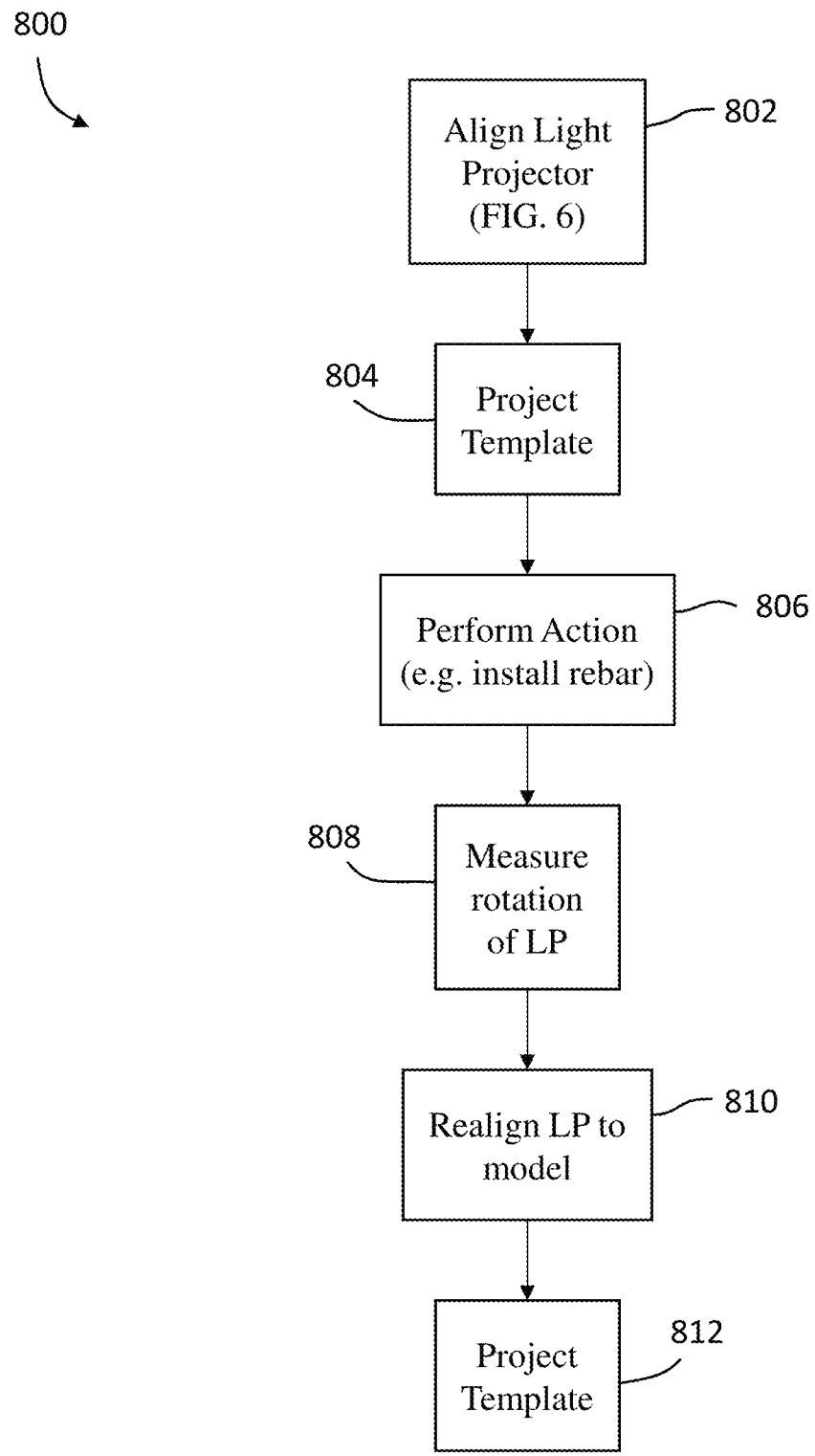
FIG. 8 is a flow diagram illustrating a method of changing an orientation of the light projector of FIG. 1 and realigning the light projector to the environment in accordance with an embodiment.

It should be appreciated that in some embodiments, the operator may desire to rotate the light projector 10' on the stand or tripod that it is mounted, such as to project a template that was outside the initial field of view, or to project a new template for example. Referring to FIG. 8, an embodiment is shown of a method 800 for rotating the light projector 10' and realigning the light projector 10' with the electronic model.

The method 800 starts in block 802 where the light projector is aligned to the electronic model, such as in the manner described in reference to FIG. 6 for example. The method 800 then proceeds to block 804 where the template is projected on to a surface in the environment and an action related to the template (e.g. install rebar cage, studwall layout, formwork position, opening position verification, class issue visualization) is performed in block 806.

The operator the rotates the light projector 10' on the stand or tripod and the amount of rotation is measured with the IMU 299. In an embodiment, the operator uses the viewfinder (displaying an image from the camera 294) while rotating the light projector 10' to orient the light projector 10' in the desired direction. The method 800 then proceeds to block 810 where the light projector 10' is realigned with the electronic model based at least in part on the angle of rotation measured by the IMU 299. With the light projector 10' realigned, the method 800 proceeds to block 812 where the new template is projected onto a surface within the field of view of the light projector 10' in the rotated position.

Figure 9:
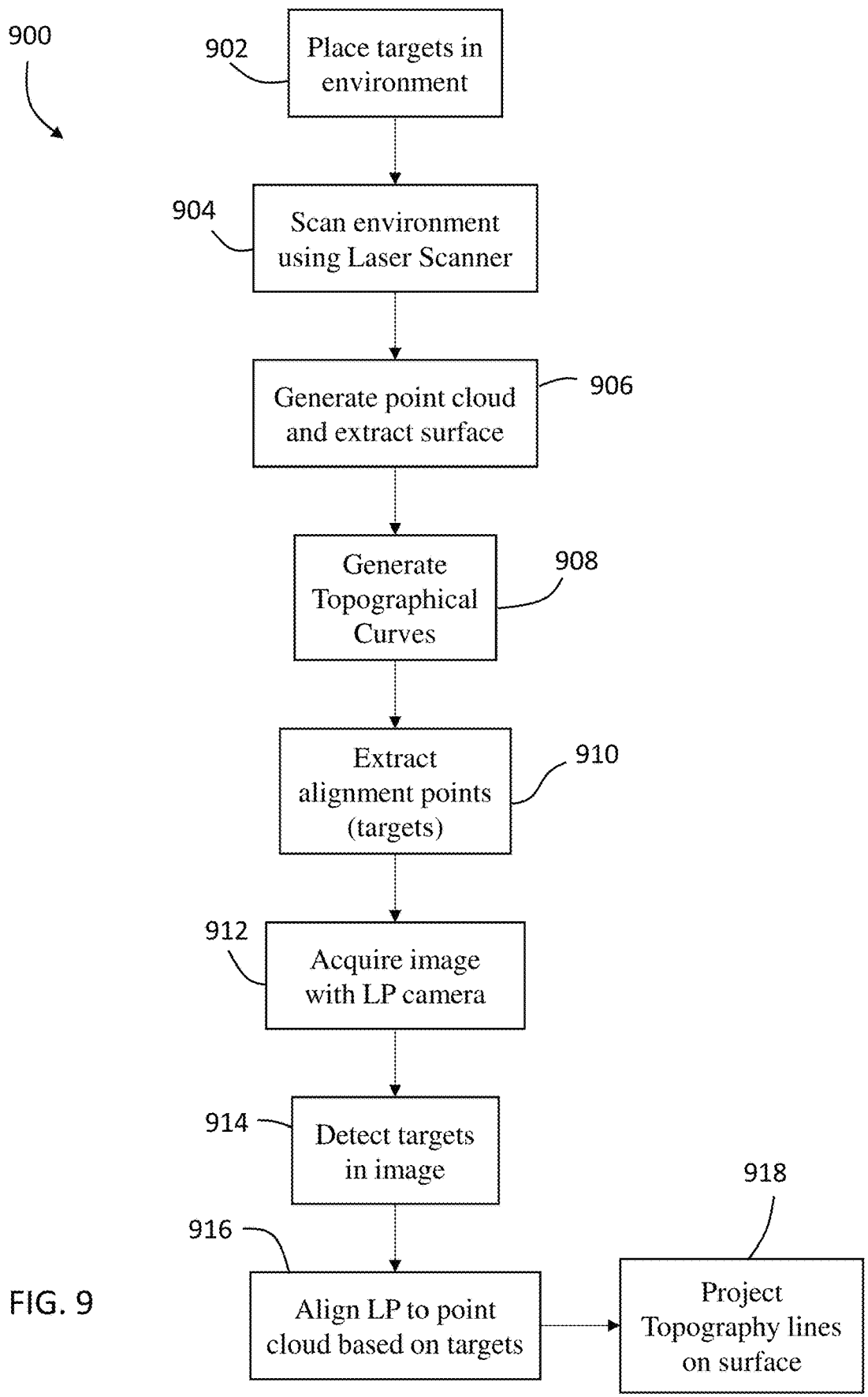
FIG. 9 is a flow diagram illustrating a method of aligning the light projector of FIG. 1 and emitting a topography line on a surface in accordance with an embodiment.

In some embodiments, it may be desirable to provide a visual indication of a floor or surface flatness. Referring now to FIG. 9, a method 900 is shown for measuring a flatness of a surface, generating topographical curves and projecting the topographical curves onto the surface with the light projector 10'. The method 900 starts in block 902 where targets (e.g. checkerboard targets) are placed in the environment. The method 900 then proceeds to block 904 where the environment is scanned with a laser scanner to measure three-dimensional (3D) coordinates of surfaces in the environment. In the illustrated embodiment, the laser scanner may be the same as that described in commonly owned U.S. Pat. No. 9,074,883 entitled "Device for optically scanning and measuring an environment" the contents of which are incorporated by reference herein.

The output of the laser scanner is a plurality of three-dimensional coordinates that represent points on the surfaces in the environment. These coordinates may be graphically represented as points, that are commonly referred to as a "point cloud." The method generates the point cloud in block 906. From the point cloud, the user can identify and extract the surface to be analyzed (e.g. the floor). From this surface, topographical curves are generated in block 908. The curves may be based on a user defined resolution or zone size that defines the sampling distance on a grid. The user may further define the isometric height for the curves (e.g. 0.25 inches). In some embodiments, the user may also define an minimum island size that defines a size of the topographical contours.

The method 900 then proceeds to block 910 where the targets from block 902 are extracted as alignment points. The operator then acquires a photographic image of the environment with the camera 294. One or more of the targets from block 902 are located within the field of view of the camera 294. The method 900 then proceeds to block 914 where the targets are detected in the photographic image. Using the extracted alignment points from block 910 and the identified targets from block 194, the method 900 proceeds to block 916 where the light projector is aligned to the point cloud. The method 900 then proceeds to project a template based on the topographical curves of block 908 to provide a visual indication of the flatness of the surface.

It should be appreciated that while the embodiment of FIG. 9 refers to a floor, this is for exemplary purposes and the claims should not be so limited. In other embodiments, the surface being measured and projected onto may be a different surface, such as but not limited to a ceiling, a wall, or a column for example.

Figure 10:
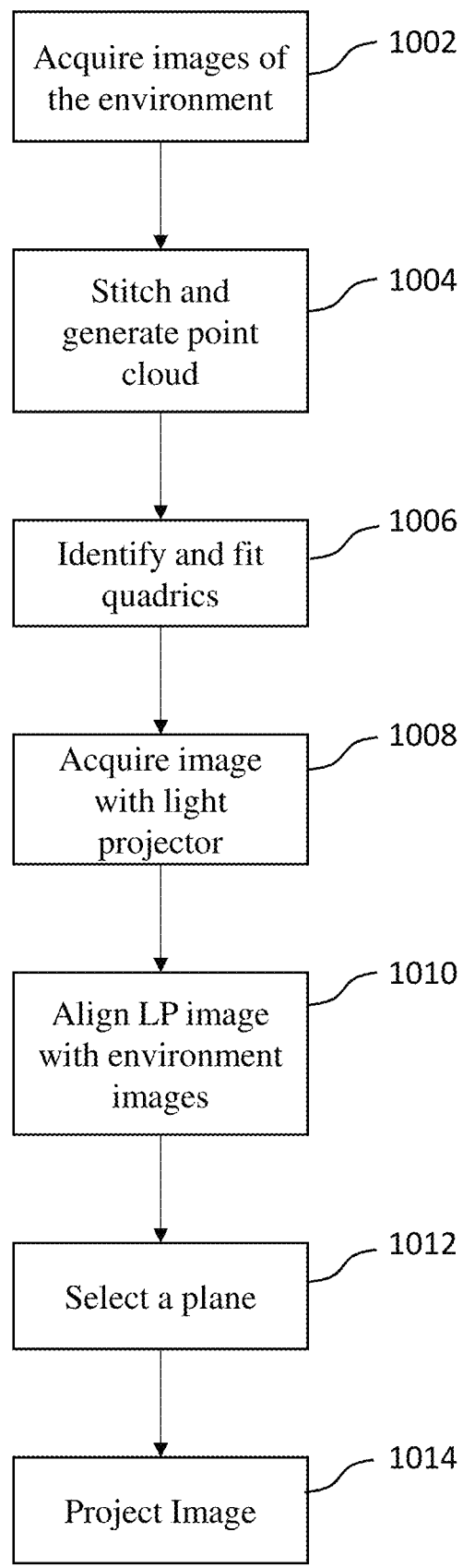
FIG. 10 is a flow diagram illustrating a method of aligning the light projector of FIG. 1 using photo stitching.

Referring now to FIG. 10, an embodiment is shown of another method 1000 for aligning the light projector 10 to the environment without using a pre-existing electronic model of the environment. In this embodiment, the method 1000 starts in block 1002 where the operator acquires a plurality of images of the environment where the light projector is to be operated. In an embodiment, the operator acquires the plurality of images in 360 degree range about the area where the light projector is to be placed. In another embodiment, the operator acquires a plurality of images in the area where the template is to be projected. In the illustrated embodiment, the plurality of images is acquired using a mobile computing device, such as a mobile phone for example.

The method 1000 then proceeds to block 1004 where the plurality of images is stitched together and used to generate a point cloud. The image stitching and point cloud generation may be performed using a known techniques, such as that provided by the FOVEX 360 software produced by Photocore AG of Schlieren, Switzerland for example. The image stitching and point cloud may be generated on the mobile computing device, a general computing device, or on a distributed computing platform (e.g. a cloud computing system).

Once the point cloud of the environment, or a portion thereof, is generated the method 1000 proceeds to block 1006 where quadratics (i.e. planes, cylinders, spheres) are identified and are fit to the point cloud. This step may also be referred to as fitting a mesh to the point cloud. In an embodiment, the mesh and quadratic locations are then transmitted to the mobile computing device or the light projector.

The method 1000 then proceeds to block 1008 where an image is acquired with the camera 294 on the light projector 10. In an embodiment, the operator moves and/or rotates the light projector 10 using the viewfinder functionality on the display 297 to orient the light projector towards the further where the template is to be projected. The method 1000 then proceeds to block 1010 where the light projector image acquired in block 1008 is aligned with the plurality of images acquired in block 1002. It should be appreciated that the alignment of the light projector image with the plurality of images allows for the alignment of the light projector 10 with the point cloud generated in block 1004 and also the quadratics generated in block 1006.

With the light projector and quadratics aligned, the method 1000 proceeds to block 1012 where the user selects a plane (e.g. one of the fitted quadratics). In an embodiment, the selection is via the display 297. In another embodiment the selection is performed via the mobile computing device that acquired the plurality of images in block 1002. In another embodiment, the display 297 is integral with the mobile computing device. With the plane selected, the method 1000 then proceeds to block 1014 where the template/projection is projected onto the surface. In an embodiment, the user may select the template/projection from a plurality of predetermined projections. The predetermined projections may include, but are not limited to, a line (pick two points), a parallel line (pick one point and a reference feature), a level line (pick one point, the IMU 299 is used for determining the reference plane), a grid (pick size and orientation), and a circle (pick location and size). It should be appreciated that in other embodiments, other predetermined projections may be provided.

It should be appreciated that while embodiments herein refer to the camera 294 as being integral with the light projector 10', this is for exemplary purposes and the claims should not be so limited. In other embodiments, the camera 294 may be separate, but in a known geometric relationship, with the light projector 10'. Further, while the camera 294 may be referred to in the singular, in some embodiments multiple camera may be used.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A method of aligning a light projector and an electronic model in an environment, the method comprising:
   placing the light projector in the environment;
   scanning the environment with a laser scanner to obtain a plurality of three-dimensional coordinates in the environment, a portion of the plurality of three-dimensional coordinates being on a surface;

extracting the surface from the plurality of three-dimensional coordinates;
generating at least two topographical curves based on a flatness of the surface;
projecting a light pattern on the surface with the light projector based at least in part on the at least two topographical curves;
selecting between acquiring an intensity image and a two-dimensional (2D) photographic image corresponding to the environment having the surface;
acquiring a selected one of the intensity image and the 2D photographic image of the environment;
identifying a plurality of features based on the selected one of the intensity image and the 2D photographic image;
associating the plurality features in the environment with a plurality of points in the electronic model; and
aligning the light projector to the electronic model based at least in part on the plurality of features and the plurality of points.

2. The method of claim 1, wherein the plurality of features is four or more features.

3. The method of claim 2, wherein the plurality of features is equal to or greater than six features.

4. The method of claim 1, further comprising checking on a periodic or aperiodic basis for drift.

5. The method of claim 4, wherein the checking for drift includes placing at least one retroreflective target in the environment and acquiring a second photographic image of the at least one retroreflective target.

6. The method of claim 5, wherein the checking for drift further comprises identifying the at least one retroreflective target in the second image and comparing a position of the at least one retroreflective target in the second image with an expected position of the at least one retroreflective target.

7. A method of aligning a light projector with a stored electronic model of an environment, comprising:
placing the light projector in the environment;
receiving a selection of acquiring one of (i) an intensity image and (ii) a two-dimensional (2D) photographic image, which corresponds to the environment;
acquiring data based on the selection;
identifying a plurality of features in the environment based on the data;
associating the plurality of features in the environment with a plurality of points in the stored electronic model;
aligning the light projector to the electronic model based at least in part on the plurality of features and the plurality of points, and
checking for an aperiodic or periodic basis for drift at least once after the aligning by:
  acquiring a second photographic image including at least one retroreflective target placed within the environment;
  identifying a position of the at least one retroreflective target in the second image; and
  comparing the position of the at least one retroreflective target in the second image with an expected position of the at least one retroreflective target in the stored electronic model; and
  realigning the light projector and the stored electronic model when a deviation between the position of the at least one retroreflective target in the second image and the expected position exceeds a threshold.

8. The method of claim 7, further comprising:
measuring an angle rotation of the light projector with at least one sensor; and
realigning the light projector to the electronic model based at least in part on the measured angle of rotation.

9. The method of claim 7, further comprising placing a plurality of targets in the environment prior to scanning with the laser scanner, the plurality of targets including the at least one retroreflective target within a field of view of the laser scanner and located in the photographic image.

10. The method of claim 9, wherein the alignment of the light projector to the electronic model is based at least in part on the plurality of targets.

11. A system comprising:
a light projector having a light source, a beam-steering system operable to direct a beam of outgoing light from the light source onto a surface, and an optical detector configured to receive at least a portion of the outgoing light reflected off of the surface;
a camera operably coupled to the light projector in a known geometric arrangement, the camera having a photosensitive array with a field of view; and
a processor that is operable to execute computer instructions to:
  receive an electronic model of an environment in which the light projector is located;
  cause the camera to acquire at least one of an intensity image and a (two dimensional (2D) photographic image of the environment;
  identify a plurality of features in the environment based on a selected one of the intensity image and the 2D photographic image;
  associate the plurality of features with a plurality of points in the electronic model;
  align the light projector and the electronic model based on the plurality of features associated with the plurality of points;
  at least one time after the light projector and the electronic model are aligned, acquire a second photographic image of the environment using the camera;
  identify a retroreflective target in the second photographic image;
  compare a position of the retroreflective target with an expected position based on the electronic model; and
  realign the light projector to the electronic model when a deviation between the position and the expected position exceeds a threshold.

12. The system of claim 11, wherein the processor is further configured to:
measure an angle of rotation of the light projector; and
realign the light projector with the electronic model based at least in part on the angle of rotation; and
measure the angle of rotation with at least one sensor integral with the light projector.

13. The system of claim 11, wherein the at least one sensor is part of an inertial measurement unit that is integral with the light projector.

14. The system of claim 11, further comprising:
a laser scanner having a second light source and a second optical detector, the laser scanner being configured to measure a plurality of three-dimensional coordinates in the environment;
wherein the processor is further configured to:
cause the laser scanner to acquire the plurality of three-dimensional coordinates, a portion of the three-dimensional coordinates being on a surface;
extract the portion of the plurality of three-dimensional coordinates;

generate at least two topographical curves based on a flatness of the surface; and cause the light projector to project a light pattern on the surface based at least in part on the at least two topographical curves.

15. The system of claim 14, wherein the electronic model is based at least in part on the plurality of three-dimensional coordinates.

16. The system of claim 11, wherein the camera is integral with the light projector.

* * * * *